Patented July 12, 1938

2,123,841

UNITED STATES PATENT OFFICE 2,123,841

PROCESS FOR MAKING MERCAPTO ARYL THIAZOLES

Albert M. Clifford, Stow, Ohio, assignor to Wingfoot Corporation, Wilmington, Del., a corporation of Delaware No Drawing. Application November 13, 1936, Serial No. 110,665

7 Claims. (Cl. 260—44)

This invention relates to a method of preparing mercapto aryl thiazoles. More particularly, it relates to an improvement in the process of preparing mercapto aryl thiazoles from a primary aromatic amine, carbon disulfide and sulfur, whereby the hydrogen sulfide generated in that process as a waste byproduct is returned to the process and utilized to the end that the sulfur required is eliminated.

Mercapto aryl thiazoles, among which 2-mercaptobenzothiazole is perhaps the best known example, are widely used as accelerators of rubber vulcanization. 2-mercaptobenzothiazole, which is used hereinafter to represent the class, is generally prepared at present by the process described in United States Letters Patent No. 1,631,871 to W. J. Kelly. This process is an excellent one as shown by its general acceptance. As directed to the preparation of 2-mercaptobenzothiazole, it may be represented by the following equation:

(1) $C_6H_5NH_2 + CS_2 + S \longrightarrow$ 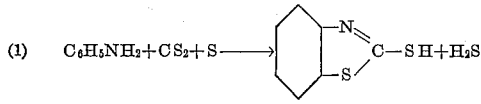 $C-SH + H_2S$

Heretofore, the hydrogen sulfide formed in the Kelly process has not been used, but is a waste product.

It is accordingly, an object of this invention to utilize this byproduct hydrogen sulfide. Another object is to employ it in the Kelly process to the end that the addition of free sulfur to subsequent charges of the reactants is unnecessary. Other objects and advantages will become apparent as the description of the invention proceeds.

It is known that aniline sulfite may be formed by burning hydrogen sulfide to sulfur dioxide, as in Equation 2, and absorbing this sulfur dioxide in aniline, as indicated by Equation 3.

(2)   $H_2S + 3/2 O_2 \rightarrow SO_2 + H_2O$ (3)   $C_6H_5NH_2 + SO_2 \rightarrow C_6H_5NH_2 \cdot SO_2$ For purposes of demonstrating the possible mechanism of the reaction involved in the present invention, it may be assumed that aniline sulfite reacts with hydrogen sulfide as in Equation 4.

(4)  $C_6H_5NH_2 \cdot SO_2 + 2H_2S \rightarrow C_6H_5NH_2 + 2H_2O + 3S$

Equation 1 is then multiplied by 3 to give Equation 5.

(5)   $3S + 3CS_2 + 3C_6H_5NH_2 \longrightarrow 3$ 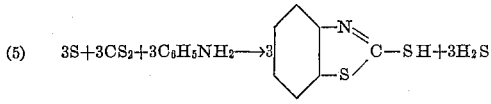 $C-SH + 3H_2S$ and Equations 4 and 5 are combined by addition. When terms are properly cancelled after this addition, the result is Equation 6.

(6) $C_6H_5NH_2 \cdot SO_2 + 2C_6H_5NH_2 + 3CS_2 \rightarrow 3$ 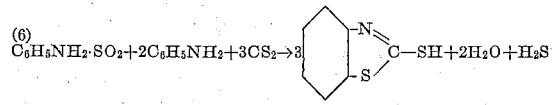 $C-SH + 2H_2O + H_2S$ which may be taken to represent the present invention. Whether the reaction mechanism actually follows the steps outlined is not known. The various equations being given merely to illustrate the manner in which the final equation was developed. As a matter of fact, the process (as will be later explained) is carried out in one step and the internal mechanism is of relatively little importance. It will be seen from Equation 6 that in the production of three mols of 2-mercaptobenzothiazole by this process there is also yielded 1 mol. of hydrogen sulfide. This mol. of hydrogen sulfide is then converted to sulfur dioxide by Equation 2 and the sulfur dioxide reacted with aniline to give the 1 mol. of aniline sulfite required in Equation 6. It is thus seen that, by the present invention, mercapto aryl thiazoles can be prepared by a process somewhat similar to that outlined in the Kelly patent but with a total elimination of the free sulfur previously required as a raw material.

Following is a specific example illustrating the practice of the invention. 1 mol. (64 grams) of sulfur dioxide was passed into 3 mols (279 grams) of aniline, forming a mixture of 2 mols of aniline and 1 mol. of aniline sulfite. To this resulting solution were added 3 mols of carbon disulfide plus an excess of 20% giving a total of 274 grams. (The excess of carbon disulfide, while not necessary, is advantageous as it promotes the reaction and increases the yield.) This mixture was heated in an autoclave. When the temperature reached 240° C., the reaction was continued at a temperature range of 235–245° C. for 3½ hours. The pressures developed ranged from 900 to 1100 pounds per square inch. At the end of 3½ hours the product was cooled, becoming a semi-crystalline mass. This was taken up with dilute sodium hydroxide solution in water. The insoluble impurities were separated and the solution was acidified in the customary manner to yield 2-mercaptobenzothiazole. This product was filtered off, washed and dried. The actual yield was 305 grams, which figure, however, was not corrected for the rather considerable mechanical losses.

The foregoing example illustrates the practice of the invention. However, it is not intended that it shall be a limitation thereof inasmuch as other primary aromatic amines suitable for the preparation of mercaptoaryl thiazoles may be employed instead of the aniline of the example. Included among these other amines are ortho and para toluidine, the alpha and beta naphthylamines, the methyl naphthyl amines, di(p-amino phenyl) methane

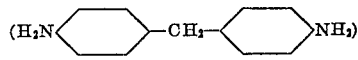

the phenetidines, the anisidines, etc. Likewise, the invention is not limited to the specific conditions of the example, but these conditions may be varied over a wide range of both temperatures and pressures. However, for most practical purposes the temperature will generally lie between 175° C. and 260° C., while the pressure will generally be above 250 pounds per square inch. Also, while the example illustrates the practice of the invention as a batch process, the reaction is also adaptable to a continuous process and may be so practiced.

Thus, while only the preferred forms of the invention have been described in detail many variations may be made therein without departing from the spirit of the invention or the scope of the appended claims in which it is intended to include all patentable novelty inherent in the invention.

What I claim is:

1. In the process of producing a mercapto aryl thiazole from a primary aromatic amine of the benzene and naphthalene series, the improvement which comprises forming the addition product of the amine with sulfur dioxide and reacting the addition product with carbon disulfide and a further quantity of the primary aromatic amine under suitable conditions of temperature and pressure.

2. The method of producing 2-mercaptobenzothiazoles which comprises reacting, under suitable conditions of temperature and pressure, a mixture of aniline, aniline sulfite, and carbon disulfide.

3. In the process of producing a mercapto aryl thiazole from a primary aromatic amine of the benzene and naphthalene series, the improvement which comprises forming the addition product of the amine with sulfur dioxide and reacting the addition product with carbon disulfide and a further quantity of the primary aromatic amine at a temperature between 175° C. and 260° C. and at a pressure of at least 250 pounds per square inch.

4. The method of producing 2-mercaptobenzothiazole which comprises reacting, at a temperature between 175° C. and 260° C. and at a pressure of at least 250 pounds per square inch, a mixture of aniline, aniline sulfite and carbon disulfide.

5. In the process of producing a 2-mercaptobenzothiazole from a primary phenyl amine, the improvement which comprises forming the addition product of the amine with sulfur dioxide and reacting the addition product with carbon disulfide and a further quantity of the primary amine under suitable conditions of temperature and pressure.

6. In the process of producing a mercapto aryl thiazole from a primary aromatic amine of the benzene and naphthalene series, the improvement which comprises forming the addition product of that amine with sulfur dioxide and reacting about one mol. of that addition product with about two mols of the primary aromatic amine and at least three mols of carbon disulfide under suitable conditions of temperature and pressure.

7. The method of producing mercapto aryl thiazoles which comprises reacting, at about 235–245° C. and about 900–1100 pounds per square inch, a mixture of about two mols of aniline, one mol. of aniline sulfite, and at least three mols of carbon disulfide.

ALBERT M. CLIFFORD.

CERTIFICATE OF CORRECTION.

Patent No. 2,123,841.  July 12, 1938.

ALBERT M. CLIFFORD.

It is hereby certified that error appears in the printed specification of the above numbered patent requiring correction as follows: Page 1, second column, line 10, after the word "various" insert intermediate; and that the said Letters Patent should be read with this correction therein that the same may conform to the record of the case in the Patent Office.

Signed and sealed this 4th day of October, A. D. 1938.

Henry Van Arsdale (Seal) Acting Commissioner of Patents.